(12) United States Patent
Gentner et al.

(10) Patent No.: US 8,746,052 B2
(45) Date of Patent: Jun. 10, 2014

(54) VALVE KEEPER VERIFICATION TOOL

(75) Inventors: Adam Gentner, Huntington Beach, CA (US); Ray de Schepper, Norwalk, CA (US); Rick Martin, Clinton Township, MI (US)

(73) Assignee: Bosch Automotive Service Solutions LLC, Warren, MI (US)

( * ) Notice: Subject to any disclaimer, the term of this patent is extended or adjusted under 35 U.S.C. 154(b) by 233 days.

(21) Appl. No.: 13/173,932

(22) Filed: Jun. 30, 2011

(65) Prior Publication Data

US 2013/0000397 A1 Jan. 3, 2013

(51) Int. Cl.
*G01M 15/02* (2006.01)

(52) U.S. Cl.
USPC ..................................... 73/114.79

(58) Field of Classification Search
USPC ............... 73/114.77, 114.79, 116.02, 116.04
See application file for complete search history.

(56) References Cited

U.S. PATENT DOCUMENTS

| | | | | |
|---|---|---|---|---|
| 1,357,817 A * | 11/1920 | Paine | ........................ | 29/213.1 |
| 3,640,129 A * | 2/1972 | Bandimere | ............... | 73/114.79 |
| 4,304,035 A * | 12/1981 | Ecker | ............................. | 29/249 |
| 4,474,059 A * | 10/1984 | Hoeptner, III | ............ | 73/114.79 |
| 5,339,515 A * | 8/1994 | Brackett et al. | ................. | 29/705 |
| 5,351,413 A * | 10/1994 | Bruner et al. | ................... | 33/611 |
| 5,749,774 A * | 5/1998 | Foster | ........................... | 451/252 |
| 5,827,954 A * | 10/1998 | Noland | .................... | 73/114.79 |
| 5,996,201 A * | 12/1999 | Ringle | ........................ | 29/213.1 |
| 6,042,456 A * | 3/2000 | Foster | ............................ | 451/51 |
| 6,199,253 B1 * | 3/2001 | Snowden | ....................... | 29/220 |
| 6,248,008 B1 * | 6/2001 | Williams | ...................... | 451/430 |
| 6,272,910 B1 * | 8/2001 | Noland | ...................... | 73/114.79 |
| 6,421,896 B1 * | 7/2002 | Beyer | .......................... | 29/213.1 |
| 6,883,245 B1 * | 4/2005 | Jirele | .............................. | 33/613 |
| 7,104,121 B2 * | 9/2006 | Firmin et al. | ............. | 73/114.79 |
| 7,104,161 B2 * | 9/2006 | De Waal | ........................ | 81/9.24 |
| 8,176,609 B2 * | 5/2012 | Branon | ........................... | 29/278 |
| 2002/0020561 A1* | 2/2002 | Alft et al. | ........................ | 175/48 |
| 2003/0121134 A1* | 7/2003 | Levy et al. | ...................... | 29/249 |
| 2005/0076524 A1* | 4/2005 | Jirele | .............................. | 33/613 |
| 2005/0279159 A1* | 12/2005 | Firmin et al. | ............... | 73/119 R |
| 2010/0223770 A1* | 9/2010 | Jenks | .............................. | 29/214 |

* cited by examiner

*Primary Examiner* — Eric S McCall
(74) *Attorney, Agent, or Firm* — Baker & Hostetler LLP

(57) ABSTRACT

A valve keeper verification tool is provided. The tool may include: an elongated body having two ends; an axial hole in one end of the body dimensioned to fit over a valve stem; and structure surrounding the hole dimensioned to contact at least one keeper of a retainer for an engine valve, wherein the tool is angled near the hole between about 10 and about 25 degrees. A method of checking to ensure a valve retaining keeper is in place may also be provided. The method may include: inserting a valve stem into a hole in a valve keeper verification tool; moving the valve keeper verification tool against a keeper; and applying a force against the keeper.

17 Claims, 3 Drawing Sheets

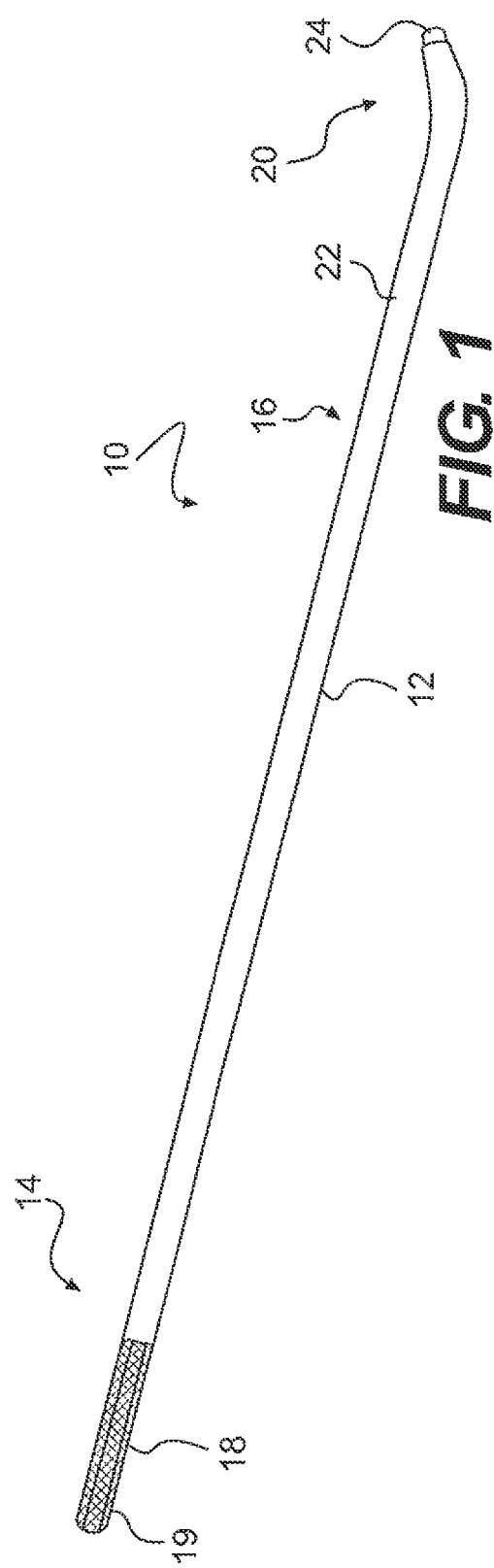
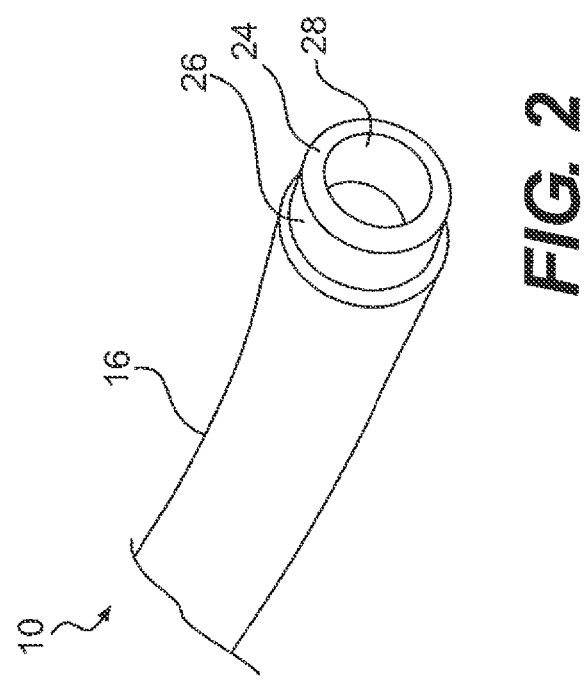

VALVE KEEPER VERIFICATION TOOL

FIELD OF THE INVENTION

The present invention relates generally to a tool for testing components of an engine valve. More particularly, the present invention relates to a tool for testing the keepers of a retainer for an engine valve in an internal combustion engine.

BACKGROUND OF THE INVENTION

Internal combustion engines include valves. The valves may have a valve stem which extends through a spring. The spring is retained by a retainer and keepers that have a detent that fit into a notch or groove in the valve stem. In order to work on or maintain the valve, the keepers may be removed. To remove the keepers, the valve spring is compressed to allow the keepers to be removed from the retainer. With the keepers displaced, the retainer is then removed.

Once the keepers and retainer are removed from the valve stem, the spring may be accessed. When replacing the retainer and the keepers back into the notch or groove of the valve stem, a valve spring retainer installer tool is often used. However, some valve spring retainer installer tools sometimes do not fully seat the valve keepers on the valve stem in the valve retainer. For example, there are some magnetic valve keeper/ valve spring retainer tools that, in particular, do not sometimes fully seat the valve keepers on the valve stem and the valve retainer.

Not fully seating the keepers on the valve stem and the valve retainer can have adverse affects. For example, when the engines runs, pressure in the cylinder and/or the valve spring can cause the valves to move out of the engine and be displaced if they are not properly retained. As a result, it may be desirable to provide a method and apparatus that can confirm whether the valve keeper is fully seated on the valve stem and the valve spring retainer.

SUMMARY OF THE INVENTION

The foregoing needs are met, to a great extent, by the present invention, wherein in one aspect an apparatus is provided that in some embodiments a method and apparatus may be provided that allows a technician to ensure that the keeper is properly installed in the retainer and on the valve stem.

In accordance with one embodiment of the present invention, a valve keeper verification tool is provided. The tool may include: an elongated body having two ends; an axial hole in one end of the body dimensioned to fit over a valve stem; and structure surrounding the hole dimensioned to contact at least one keeper of a retainer for an engine valve, wherein the tool is angled near the hole between about 10 and about 25 degrees.

In accordance with another embodiment of the present invention, a method of checking to ensure a valve retaining keeper is in place may also be provided. The method may include: inserting a valve stem into a hole in a valve keeper verification tool; moving the valve keeper verification tool against a keeper; and applying a force against the keeper.

In accordance with yet another embodiment of the present invention, a valve keeper verification tool may be provided. The tool may include: an elongated body having two ends; and means for engaging a keeper and valve stem located at one end of the body.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 1 is a perspective view of a valve keeper verification tool in accordance with the embodiment of the invention.

FIG. 2 is a perspective view of one end of the tool shown in FIG. 1.

DETAILED DESCRIPTION

Figure 3:
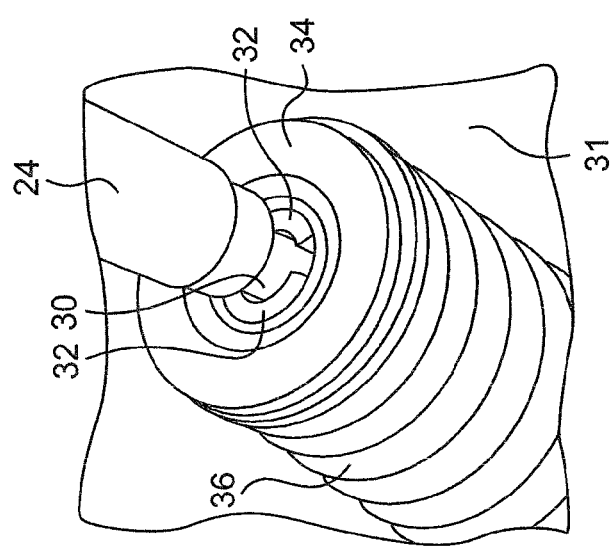
FIGS. 3-5 are a series of drawings showing a valve keeper verification tool being placed and fully seated on a valve stem in accordance with an embodiment of the invention.

The invention will now be described with reference to the drawing figures, in which like reference numerals refer to like parts throughout. Embodiments in accordance with the present invention may provide a valve keeper verification tool and a method for verifying that a valve keeper is properly seated.

An embodiment in accordance with the present invention includes a valve keeper verification tool 10. A valve keeper verification tool 10 includes a body 12 or shaft 12. The tool 10 may be made of steel or any other suitable material and may be coated with a rust or corrosion resistant coating.

In some embodiments of the invention, the tool 10 may have a circular cross-section as shown in FIG. 2. Returning now to FIG. 1, the tool 10 has two ends 14, 16. At one end 14 is a handle 18. The handle 18 may include knurling 19 cut into the body 12 to form the handle 18. At the other end 16 of the tool 10 there may be an angled portion 22. The angled portion 22 may be part of a receiving end 20 which is terminated with an engaging end 24.

As shown in FIG. 2, the end 16 of the tool 10 may include a reduced diameter portion 26 and a hole 28. The hole 28 may be dimensioned to fit over a valve stem 30 (which will be discussed further below). Engaging end 24 also contains structure that will press against the keepers 32 as will be discussed further below.

Figure 4:
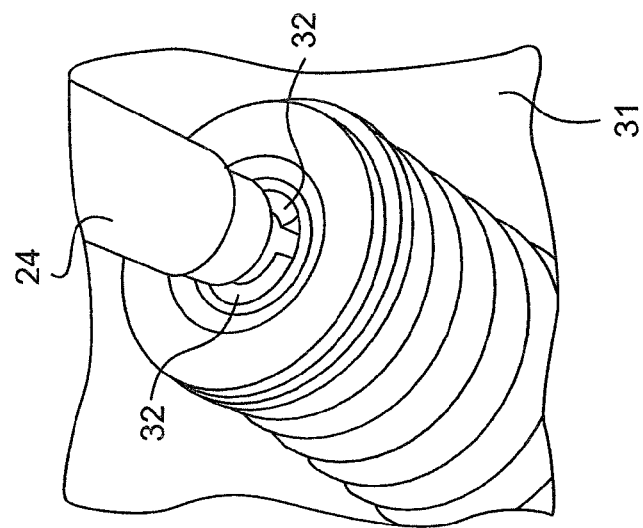
Figure 5:
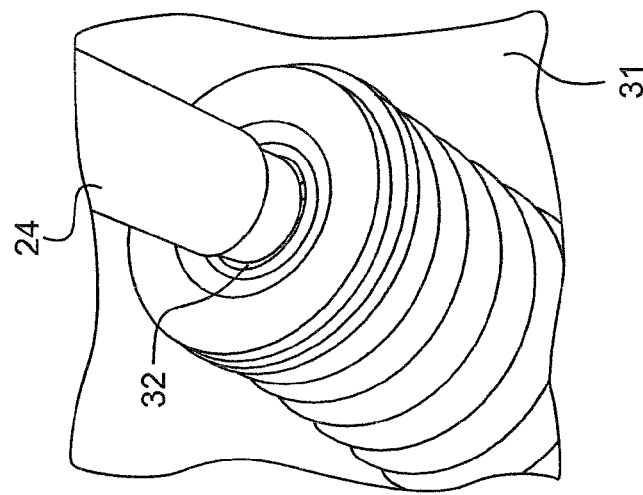

FIGS. 3-5 are a sequence of drawings that illustrate the engaging end 24 of the tool 10 fitting over a valve stem 30 of an engine 31. As shown in FIGS. 3-5, the hole 28 of the engaging end 24 is placed over the valve stem 30 until the engaging end 24 contacts the keepers 32. Once the engaging end 24 has been fit over the valve stem 30 and engages the keepers 32 as illustrated in FIG. 5, user may strike the opposite end 14 with a hammer to ensure that the keepers 32 are properly seated.

A technician can tell if the keepers 32 are properly seated by hearing, seeing and/or feeling how the tool 10 reacts to a hammer blow. For example, if the tool 10 moves axially toward the keepers 32 when the tool 10 is struck axially on the handle end 14, than the technician will know that the keepers 32 were not seated. If the tool 10 does not move down toward the keepers 32 and may bounce back as a result of the hammer blow, the technician will know that the keepers 32 were properly seated.

One of ordinary skill in the art will quickly be able to determine how the tool 10 will react to a hammer blow with the keepers 32 are in place and not in place with a little practice.

Figure 6:
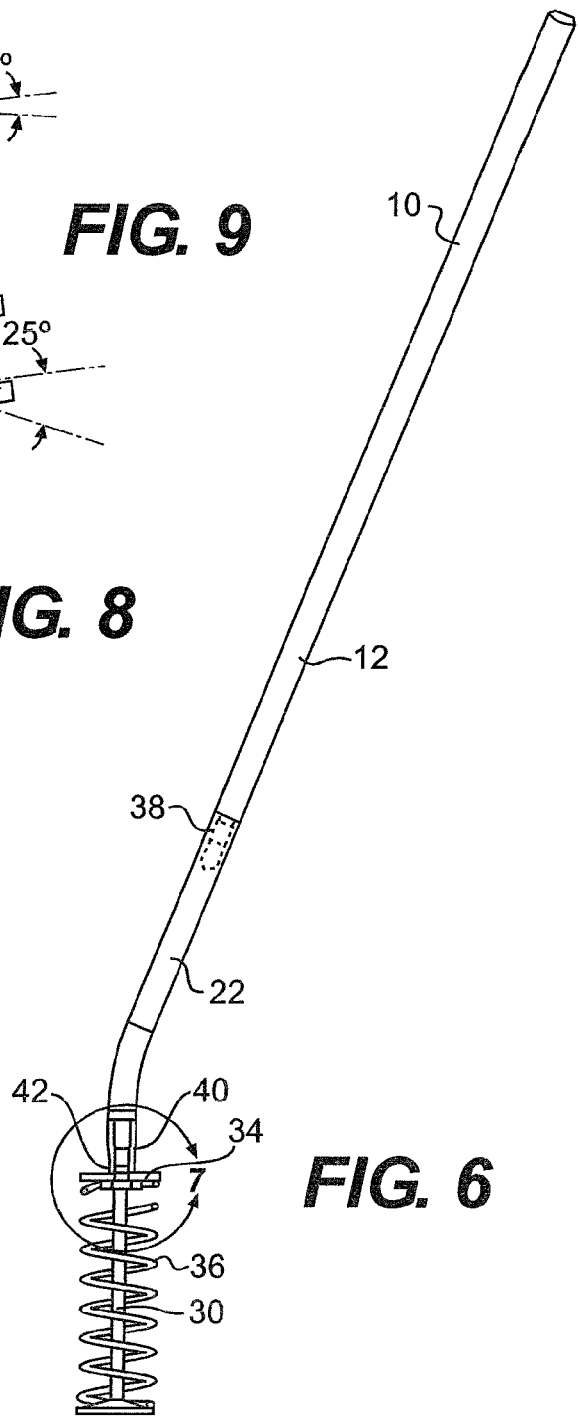
FIG. 6 is a side, see-through view of a second embodiment of a valve keeper verification tool seated on a valve stem according to a second embodiment of the invention.

Turning now to FIG. 6, FIG. 6 shows another embodiment of a valve keeper verification tool 10 in accordance with the invention. FIG. 6 is a see-through view. The threaded connection 38 of the shaft 12 with the angle portion 22 is shown. While a connection 38 includes threads, other types of connections can also be used in accordance with the invention.

In the embodiment shown in FIG. 6, the tool 10 is made of several pieces including the shaft 12 and the angled portion 22. This is in contrast to the unified embodiment shown in FIG. 1. The angled portion 22 includes an adapter 40 which contains a hole 42 that is placed over the valve stem 30. The spring 36 and the retainer 34 which holds the spring 36 in place are shown along with the valve stem 30, however the engine block is removed for clarity.

Figure 7:
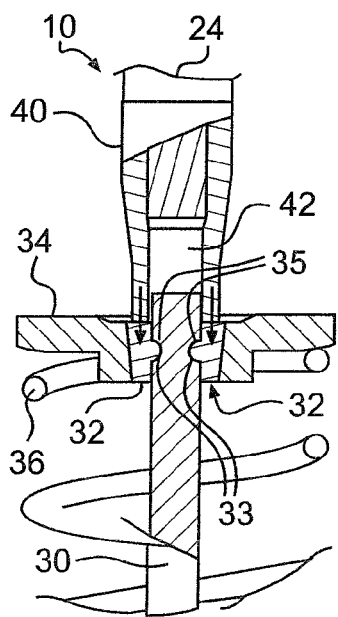
FIG. 7 is an enlarged detail cross-section view of the portion of the tool shown in FIG. 6.

Arrow 7 shows a portion of the tool 10 that is enlarged in FIG. 7. As shown in FIG. 7, the tool 10 includes the engaging end 24. The engaging end 24 is connected to an adapter 40. The adapter 40 and the engaging end 24 may be threaded together or, in other embodiments, may be connected by a friction fit or any other suitable type of connection. The adapter 40 also has a hole 42. The hole 42 provides a similar function as the hole 28 shown in the embodiment of FIGS. 1 and 2. The hole 42 is placed over the valve stem 30, such that the engaging end 24 contacts the keepers 32.

The keepers 32 have detent 33 that fits within a groove 35 or a notch 35 in the valve stem 30 as shown in FIG. 7. As discussed above, sometimes the detents 33 are not properly placed within the groove 35 or notch 35 of the valve stem 30. One of the purposes of the tool 10 is to ensure that the detent 33 are located in the groove or notch 35 and the valve stem 30. Placing the detent 33 in the groove or a notch 35 of the valve stem 30 ensures that the retainer 34 is held in place against the urging of the spring 36.

In some instances, striking the tool 10 with a hammer or initiating other some other downward force as shown by the arrows against the keepers 32 may cause the detent 33 to be placed or moved into the groove 35 or notch 35 in the valve stem 30. If the keepers 32 were not properly seated, they may be moved and thus properly seated as a result of the force transferred onto the keepers 32 from the tool 10.

Figure 8:
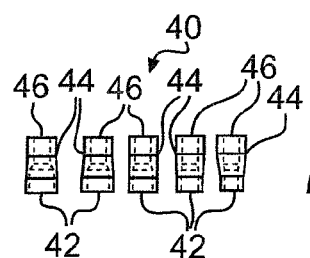
FIG. 8 is a see-through side view of various adapters that may be used on the tool shown in FIGS. 6 and 7.

In some embodiments of the invention, different adapters 40 may be used according to various sizes of valve stems 20 which may change from engine to engine. As shown in FIG. 8, various adapters 40 are shown. These adapters 40 may be connected to the angle portion 22 as shown in FIG. 6.

Returning to FIG. 8, the adapters 40 include holes 42 to be placed over the valve stem 30 and also to include connecting holes 46 for attaching to the angle portion 22.

Figure 9:
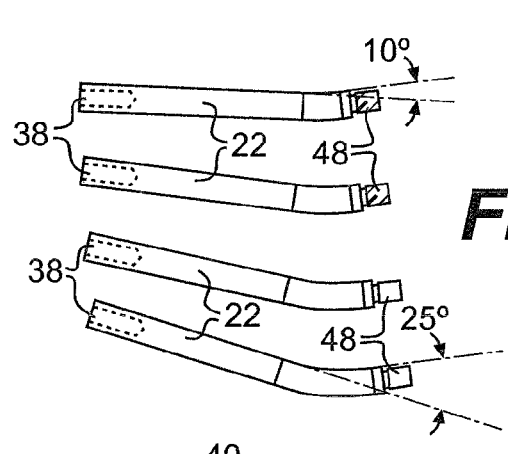
FIG. 9 is a see-through side view of various angle portions that may be used in accordance with the valve keeper verification tool shown in FIGS. 6 and 7.

In some embodiments of the invention, the attaching holes 46 may be threaded to attach to corresponding threads on the adapter knob 48 as shown in FIG. 9 of the angle portion 22. In other embodiments of the invention, the adapters 40 may attach to an attaching knob 48 of the angle portion 22 with a fiction fit.

For example, O-rings 44 may be located in the adapters 40 as shown in FIG. 8 which deform as the adapter knob 48 moves through the attaching hole 46 of the adapters 40. The deformation of the O-ring 44 may cause a friction connection between adapter 40 and the angle portion 22.

In some embodiments of the invention it may be desirable to have the angle portion 22 angled at various different angles in order to avoid interference with various engine components to allow the tool 10 to reach the valves stems 30.

FIG. 9 shows examples of various angles that may be associated with angle portions 22, for example, angles of about 10° through about 25° are shown by example by various angle portions 22. As discussed below, the angle portions 22 as shown in FIG. 9 may include a threadable connection 38 and an adapter knob 48. In some embodiments of the invention, adapter knob 48 may be threaded. While the angles shown in FIG. 9 show about 10° through about 25° of an angle, other angles including 0° may also be used in accordance with some embodiments of the invention.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A valve keeper verification tool comprising:
    an elongated body having two ends, one end defining an axis and being an engaging end being annular in shape and formed, at least in part, by a reduced diameter portion;
    an axial hole in the engaging end helping form the annular shape, the hole having an axis coaxial with the axis of the end of the elongated body, the hole dimensioned to fit over a valve stem; and
    structure surrounding the hole dimensioned to contact at least one keeper of a retainer for an engine valve,
    wherein the tool is angled near the hole between about 10 and about 25 degrees, and wherein the angle in the tool occurs at an angled portion of the tool that is threadibly attached to the body.

2. The tool of claim 1, further comprising a removable adapter mounted to the angled portion, wherein it is the removable adapter that contains the hole.

3. The tool of claim 2, further comprising more than one removable adapters having holes of different sizes.

4. The tool of claim 2, wherein the removable adapter attaches to the angled portion via threads.

5. The tool of claim 2, wherein the removable adapter attaches to the angled portion via a friction fit.

6. The tool of claim 5, further comprising an O ring located between the removable adapter and the angled portion, wherein the O ring contributes to the friction fit.

7. The tool of claim 1, further comprising knurling on the body at an opposite end of the tool from the hole.

8. The tool of claim 1, wherein the tool has a circular cross-section.

9. The tool of claim 1, wherein the tool is made of steel.

10. The tool of claim 9, wherein the tool is coated with a corrosion resistant coating.

11. A method of checking to ensure a valve retaining keeper is in place comprising:
fitting a valve keeper verification tool with an angled portion having a desired angle, wherein the angled portion is fitted onto the value keeper verification tool via threads;
inserting a valve stem into the hole in the valve keeper verification tool wherein the hole is coaxial with the tool;
moving the valve keeper verification tool directly against the valve retaining keeper; and
applying a force against the valve retaining keeper with the valve keeper verification tool.

12. The method of claim 11, wherein the force is applied by hitting the valve retaining keeper verification tool with a hammer.

13. The method of claim 11, further including gripping the tool at a place on the tool where there is knurling.

14. The method of claim 11, further comprising feeling the tool as a first force is applied against the valve retaining keeper to detect whether the valve retaining keeper is displaced as a result of the first force and adding a second force to the valve retaining keeper via the tool if the valve retaining keeper was displaced.

15. The method of claim 11, further comprising fitting an adapter with a hole sized to correspond with a valve stem associated with the valve retaining keeper to be checked onto the valve keeper verification tool.

16. The method of claim 15, wherein the adapter is fitted onto the tool by at least one of: a friction fit and via threads.

17. A valve keeper verification tool comprising:
an elongated body having two ends, the elongated body defining an axis; and
means for engaging a keeper and valve stem located at one end of the body,
the means for engaging including an engaging end having an annular shape formed,
at least in part, by a reduced diameter section and an axial hole, the axial hole defining an axis that is coaxial with the axis defined by the body, wherein the tool is angled near the axial hole between about 10 and about 25 degrees, and wherein the angle in the tool occurs at an angled portion of the tool that is threadibly attached to the body.

\* \* \* \* \*